(12) United States Patent
Kim et al.

(10) Patent No.: US 8,771,897 B2
(45) Date of Patent: Jul. 8, 2014

(54) ELECTROLYTE MEMBRANE FOR FUEL CELL INCLUDING BLEND OF POLYMERS WITH DIFFERENT DEGREES OF SULFONATION, AND MEMBRANE-ELECTRODE ASSEMBLY AND FUEL CELL INCLUDING THE SAME

(75) Inventors: Hyoung-Juhn Kim, Gyeonggi-do (KR); Soo-Kil Kim, Seoul (KR); Eun Ae Cho, Seoul (KR); Jong Hyun Jang, Gyeonggi-do (KR); Sung Pil Yoon, Gyeonggi-do (KR); In Hwan Oh, Seoul (KR); Jonghee Han, Seoul (KR); Seong Ahn Hong, Seoul (KR); Suk-Woo Nam, Seoul (KR); Tae Hoon Lim, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 151 days.

(21) Appl. No.: 13/186,652

(22) Filed: Jul. 20, 2011

(65) Prior Publication Data
US 2012/0237850 A1    Sep. 20, 2012

(30) Foreign Application Priority Data
Mar. 18, 2011    (KR) .......................... 10-2011-0024294

(51) Int. Cl.
*H01M 8/10*    (2006.01)

(52) U.S. Cl.
USPC ............. 429/494; 429/483; 429/493; 521/27; 521/33

(58) Field of Classification Search
CPC ............................. H01M 8/881; H01M 8/1041
USPC ....................... 429/493, 494, 483; 521/27, 33
See application file for complete search history.

(56) References Cited

U.S. PATENT DOCUMENTS

| | | | |
|---|---|---|---|
| 2002/0172850 A1* | 11/2002 | Asano et al. ..................... | 429/33 |
| 2007/0066759 A1* | 3/2007 | Onodera et al. .............. | 525/242 |
| 2007/0231655 A1* | 10/2007 | Ha et al. ........................... | 429/33 |
| 2009/0176052 A1* | 7/2009 | Childs et al. ................... | 428/101 |
| 2010/0167165 A1* | 7/2010 | Masui et al. ................... | 429/492 |

FOREIGN PATENT DOCUMENTS

| | | | |
|---|---|---|---|
| JP | 2008-155386 | * | 7/2008 |
| KR | 20090125516 | * | 12/2009 |

OTHER PUBLICATIONS

W.J. Lau, A.F. Ismail, Journal of Membrane Science, 334 (2009) 30-42.*
Bi et al Journal of Membrane Science 350 (2010) 109-116.*
Ko Ha-na Membrane Journal (2009), 19(4), 291-301.Abstract.*
KR20090125516 translation.*

* cited by examiner

Primary Examiner — Patrick Ryan
Assistant Examiner — Alex Usyatinsky
(74) Attorney, Agent, or Firm — Ladas & Parry LLP

(57) ABSTRACT

Disclosed herein is an electrolyte membrane for a fuel cell. The electrolyte membrane includes a blend of polymers with different degrees of sulfonation. The electrolyte membrane can exhibit excellent effects such as improved long-term cell performance and good long-term dimensional stability while at the same time solving the problems of conventional hydrocarbon electrolyte membranes. Further disclosed are a membrane-electrode assembly and a fuel cell including the electrolyte membrane.

16 Claims, 4 Drawing Sheets

ELECTROLYTE MEMBRANE FOR FUEL CELL INCLUDING BLEND OF POLYMERS WITH DIFFERENT DEGREES OF SULFONATION, AND MEMBRANE-ELECTRODE ASSEMBLY AND FUEL CELL INCLUDING THE SAME

BACKGROUND OF THE INVENTION

1. Field of the Invention

The present invention relates to an electrolyte membrane for a fuel cell including a blend of polymers with different degrees of sulfonation, a membrane-electrode assembly including the electrolyte membrane, and a fuel cell including the electrolyte membrane.

2. Description of the Related Art

Polymer electrolyte fuel cells (PEFCs) developed hitherto have employed Nafion membranes, which are perfluorosulfonated polymer membranes produced by DuPont, as electrolyte membranes. However, Nafion membranes are not attractive from the viewpoint of industrial application due to their high prices. Another disadvantage of Nafion membranes is high fuel permeability. Under such circumstances, a great deal of research has been conducted on electrolyte membranes using hydrocarbon polymers.

Generally, hydrocarbon polymer electrolyte membranes have better barrier properties and can be produced at lower cost than perfluorosulfonated polymer membranes, but have disadvantages of relatively high water solubility and poor dimensional stability, making it impossible to provide long-term stability comparable to that of perfluorosulfonated polymer membranes. Due to these disadvantages, attempts to commercialize perfluorosulfonated polymer membranes have not yet been successful.

SUMMARY OF THE INVENTION

The present invention has been made in an effort to solve the problems of prior art hydrocarbon electrolyte membranes, and it is an object of the present invention to provide a polymer electrolyte membrane that exhibits excellent effects, such as improved long-term cell performance and good long-term dimensional stability. It is another object of the present invention to provide a membrane-electrode assembly and a fuel cell including the polymer electrolyte membrane.

According to an aspect of the present invention, there is provided an electrolyte membrane for a fuel cell which includes a blend of two or more sulfonated polymers of the same kind or different kinds with different degrees of sulfonation.

In one embodiment, the two or more sulfonated polymers are each independently a sulfonated hydrocarbon polymer selected from poly(ether sulfone)s, poly(thiosulfone)s, poly(ether ether ketone)s, polyimides, polystyrenes, polyphosphazenes, and random or block copolymers of the aforementioned polymers. It is particularly preferred that the two or more sulfonated polymers be each independently a sulfonated poly(ether sulfone), a poly(thiosulfone) or a poly(ether ether ketone) that can further maximize the desired effects of the present invention.

In a further embodiment, each of the two or more sulfonated polymers is prepared by sulfonation of a non-sulfonated or low-sulfonated polymer or by polymerization of one or more sulfonated monomers. That is, each of the two or more sulfonated polymers may be prepared by sulfonation of a non-sulfonated polymer, by sulfonation of a polymer having a low degree of sulfonation, or by direct polymerization so long as the two or more sulfonated polymers have different degrees of sulfonation within the ranges mentioned in exemplary embodiments of the present invention, In another embodiment, the difference in average degree of sulfonation between the two or more sulfonated polymers is typically as large as, preferably twice larger than, more preferably three times larger than the maximum of the standard deviations of the individual degrees of sulfonation of the two or more sulfonated polymers. That is, each of the two or more sulfonated polymers, particularly those prepared by subsequent sulfonation, may have a distribution of degree of sulfonation that can be characterized to some extent. However, it was confirmed that the desired effects of the present invention can be achieved only when distributions of the degrees of sulfonation of the two or more sulfonated polymers are substantially separated. The term "substantial separation of degrees of sulfonation" used herein means that the difference in average degree of sulfonation is typically as large as, preferably twice larger than, more preferably three times larger than the maximum of the standard deviations of the individual degrees of sulfonation.

In another embodiment, the average degrees of sulfonation of the two or more sulfonated polymers are different from each other by at least 5 to 40%, preferably 10 to 30%, more preferably 15 to 30%.

In one embodiment, each of the two or more sulfonated polymers is a block copolymer prepared by condensation of (i) one or more monomers having a sulfonic acid group and (ii) one or more monomers having no sulfonic acid group in a specified molar ratio. The degree of sulfonation of the block copolymer is nearly monodisperse. This monodispersity advantageously contributes to the maximization of the desired effects of the present invention.

In a further embodiment, the two or more sulfonated polymers are of the same kind. The two or more sulfonated polymers may of different kinds so long as they are sufficiently compatible with each other to prevent deterioration of physical properties at their interfaces.

The use of the blend of two or more sulfonated polymers of the same kind with different degrees of sulfonation is more advantageous in maximizing the desired effects of the present invention. A blend of two or more poly(aryl ether sulfone)s with different degrees of sulfonation is particularly preferred.

In one embodiment, each of the poly(aryl ether sulfone)s is prepared by polymerization of 4-fluorophenyl sulfone, a bis(4-fluoro-3-sulfophenyl)sulfone salt and 4,4'-biphenol in a specified molar ratio.

In a further embodiment, the polymer blend is a blend of two poly(aryl ether sulfone)s having different degrees of sulfonation of 35 to 60% and 5 to 35%, the difference in degree of sulfonation between the poly(aryl ether sulfone)s being at least 5 to 40%.

In another embodiment, the polymer blend is a blend of three poly(aryl ether sulfone)s having different degrees of sulfonation of 40 to 60%, 15 to 40% and 5 to 15%, the difference in degree of sulfonation between the poly(aryl ether sulfone)s being at least 5 to 40%.

In another embodiment, the polymer blend is a blend of four poly(aryl ether sulfone)s having different degrees of sulfonation of 45 to 55%, 35 to 45%, 25 to 35% and 15 to 25%, the difference in degree of sulfonation between the poly(aryl ether sulfone)s being at least 5 to 40%.

In accordance with a further aspect of the present invention, there is provided a membrane-electrode assembly including the electrolyte membrane according to any one of the exemplary embodiments of the present invention.

In accordance with another aspect of the present invention, there is provided a fuel cell including the electrolyte membrane according to any one of the exemplary embodiments of the present invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE INVENTION

Figure 1:
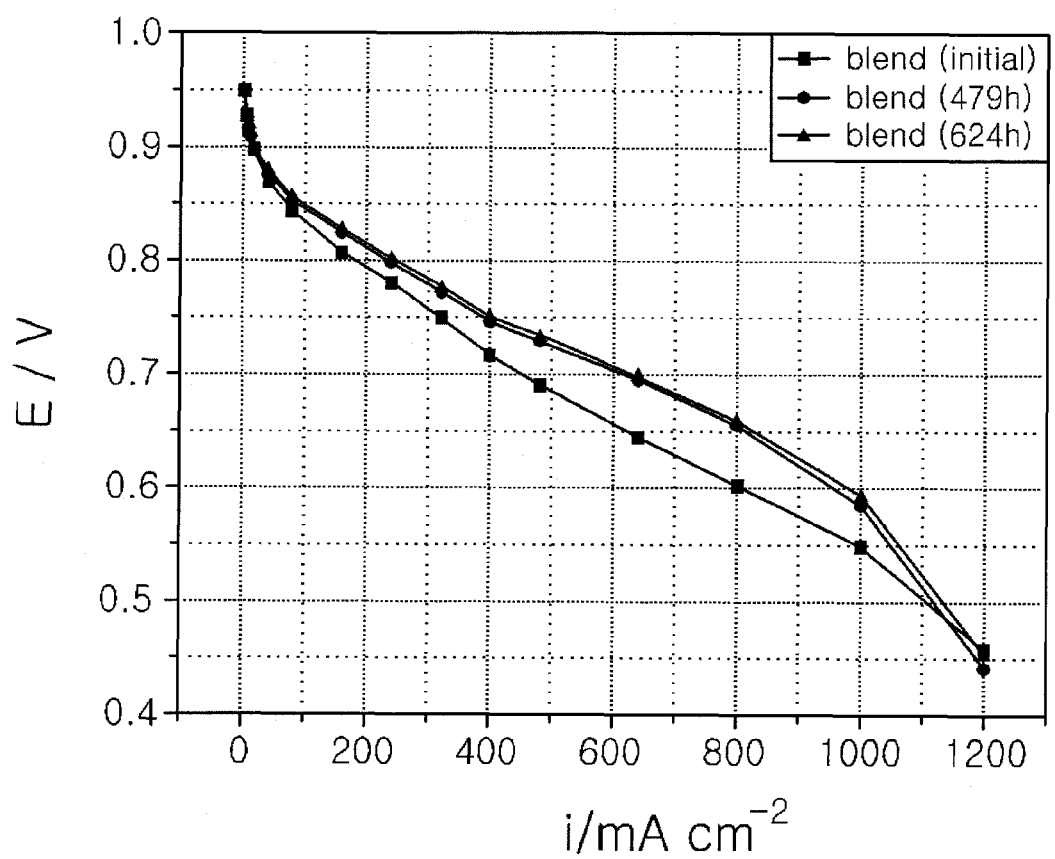
FIG. 1 shows test results for long-term performance of a membrane-electrode assembly including a blend electrolyte membrane produced in accordance with an exemplary embodiment of the present invention.

The conductivity and hydrophilicity of a polymer electrolyte increase in proportion to the degree of sulfonation of the polymer electrolyte. However, excessive hydrophilicity is likely to cause an increase in water solubility and severe swelling of the polymer electrolyte. Conversely, a polymer electrolyte having a low degree of sulfonation is strongly resistant to water due to its high hydrophobicity but has the problem of low conductivity. Accordingly, when designing a new polymer electrolyte membrane, it is very important to suitably select the degree of sulfonation of a polymer electrolyte to be used in the polymer electrolyte membrane as a factor determining the hydrophilicity and hydrophobicity of the polymer electrolyte.

For example, a disulfonated or monosulfonated monomer may be used to prepare a sulfonated poly(ether sulfone) of Formula 1a or 1b as a hydrocarbon polymer electrolyte at low cost.

In this case, the high degrees of sulfonation exceeding 55 mole % and 70 mole %) may deteriorate the stability of the corresponding polymer electrolytes in water.

In an embodiment of the present invention, a polymer having a degree of sulfonation sufficiently high to cause poor water stability is blended with a polymer having a low degree of sulfonation to prepare a polymer blend with improved water stability that is capable of sufficiently functioning as a material for an electrolyte membrane. In view of this, there is no reason to limit the degree of sulfonation of a polymer for an electrolyte membrane to a particular level, such as 55 mole % or 70 mole %.

Notwithstanding this, it is preferred that the two or more sulfonated polymers have such a degree of sulfonation that they are independently stable in water, in order to simultaneously maximize the desired effects of the present invention.

On the other hand, a polymer may be reacted with sulfuric acid to prepare a sulfonated polymer, as depicted in Reaction 1.

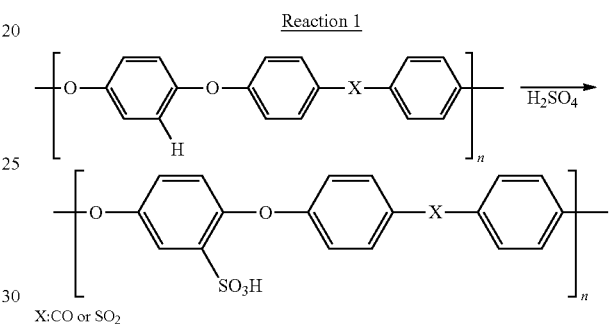

Reaction 1

X: CO or SO$_2$

In this case, the water stability of the sulfonated polymer varies widely depending on where and to what degree the sulfonation occurs.

The present invention provides a blend of hydrocarbon polymer electrolytes with different degrees of sulfonation to improve the dimensional stability of the electrolyte having a higher degree of sulfonation in water while at the same time enhancing the conductivity of the electrolyte having a lower degree of sulfonation.

In the case of a blend of a sulfonated polymer and a non-sulfonated polymer, the sulfonated polymer tends to get entangled because of non-uniform mixing of the two polymers in the blend. In recent years, blends of acidic and basic polymers have been investigated for use as electrolyte membranes. However, most of these blends are prepared by acid doping and have limited use at high temperatures.

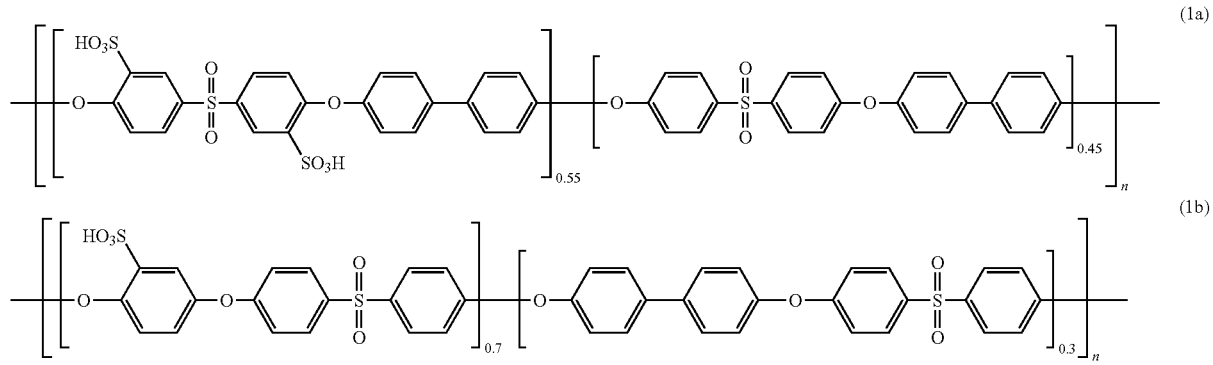

An example of the synthesis of sulfonated polymers such as poly(ether sulfone), poly(thiosulfone) and poly(ether ether ketone) is depicted in Reaction 2:

Reaction 2

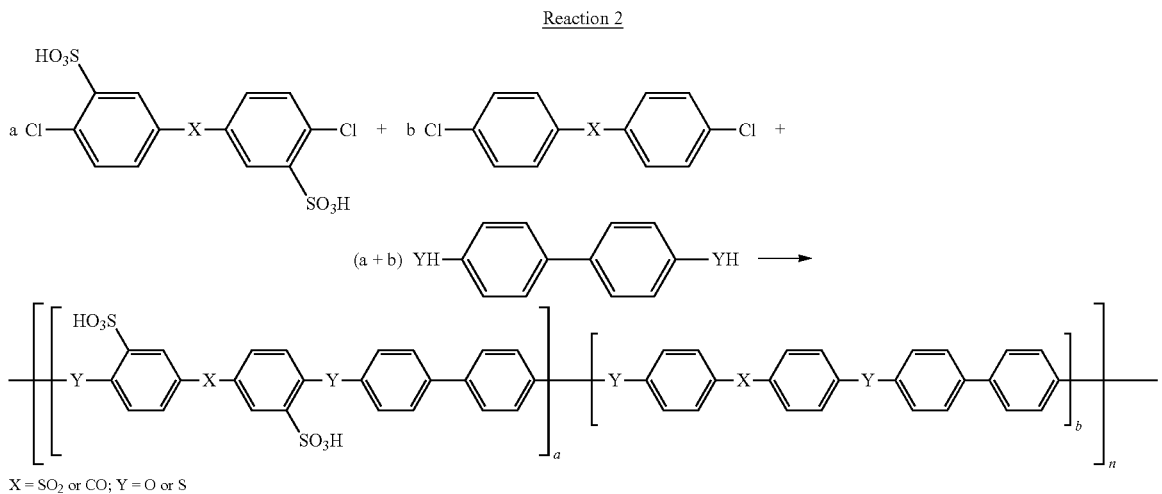

X = SO$_2$ or CO; Y = O or S

It should be understood that this reaction can be applied to the synthesis of other polymer electrolytes including sulfonated polyimide and sulfonated polystyrene.

EXAMPLES

Hereinafter, the exemplary embodiments of the present invention will be explained in more detail with reference to the following examples. However, these examples serve to provide further appreciation of the invention and are not to be construed as limiting the scope of the invention.

Preparative Example 1

Synthesis of Sulfonated Polymer

In this example, the polymer of Formula 1a was prepared as depicted in Reaction 3.

First, 4-fluorophenyl sulfone (1.67 g, 6.55 mmol), 4,4'-biphenol (2.44 g, 13.10 mmol), bis(4-fluoro-3-sulfophenyl) sulfone disodium salt (3.00 g, 6.55 mmol) and K$_2$CO$_3$ (3.62 g) were dispersed in a mixed solvent of toluene (40 mL) and dimethylacetamide (25 mL). The dispersion was heated to reflux at 140° C. using a Dean-Stark trap under a nitrogen atmosphere for 4 hr. Thereafter, the toluene was removed by simple distillation and the remaining reaction mixture was heated under a nitrogen atmosphere at 180° C. for 20 hr to obtain a polymer mixture. The polymer mixture was washed several times with a mixed solvent of HCl (100 mL)/methanol (200 mL) and water, and dried in a vacuum oven at 60° C. for 24 hr, affording the desired polymer having a degree of sulfonation of 50%.

Preparative Examples 2-4

Synthesis of Sulfonated Polymers

Sulfonated polymers were synthesized in the same manner as in Preparative Example 1, except that the amounts of the reactants were changed as shown in Table 1.

Reaction 3

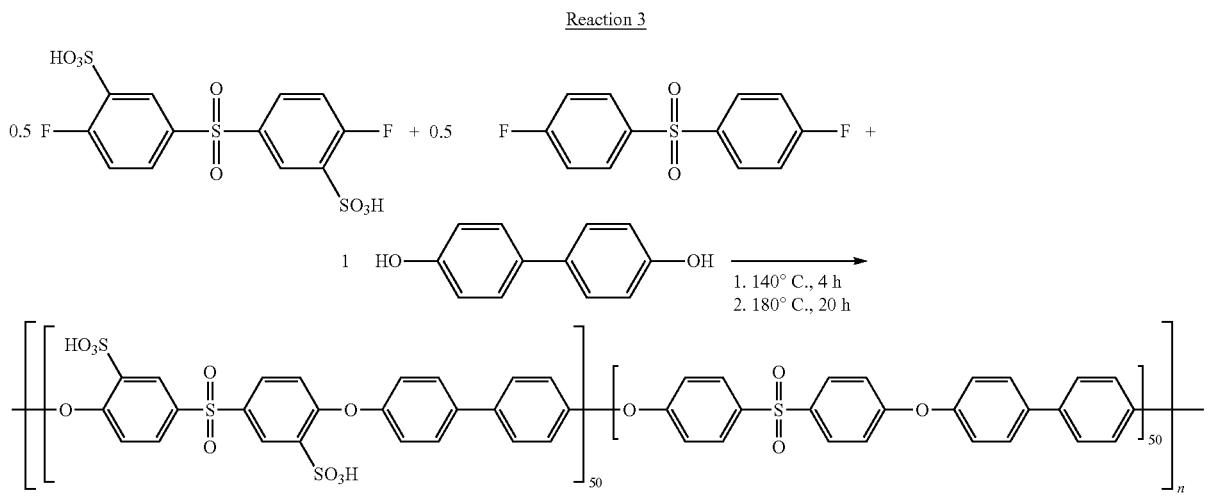

TABLE 1

| Degree of sulfonation (%) | 4-Fluorophenyl sulfone (mol) | Bis(4-fluoro-3-sulfophenyl)sulfone disodium salt (mol) | 4,4'-Biphenol (mol) |
|---|---|---|---|
| 40 | 7.86 | 5.24 | 13.10 |
| 30 | 9.17 | 3.93 | 13.10 |
| 20 | 10.48 | 2.62 | 13.10 |

Example 1

Production of Blend Electrolyte Membrane

The sulfonated polymer having a degree of sulfonation of 50% (2.5 g), the sulfonated polymer having a degree of sulfonation of 40% (0.7 g), the sulfonated polymer having a degree of sulfonation of 30% (0.5 g) and the sulfonated polymer having a degree of sulfonation of 20% (0.3 g) were dissolved in 20 mL of NMP. The solution was applied to a glass plate to a uniform thickness using a doctor blade and dried under reduced pressure at a temperature of 80° C. to form a film. Thereafter, the film was treated with an aqueous solution of HCl (10 wt %) to produce a blend electrolyte membrane.

Comparative Examples 1-4

Production of Single-Component Electrolyte Membranes 4 g of each of the sulfonated polymers having degrees of sulfonation of 50%, 40%, 30% and 20% was dissolved in 20 mL of NMP. The solution was applied to a glass plate to a uniform thickness using a doctor blade and dried under reduced pressure at a temperature of 80° C. to form a film. Thereafter, the film was treated with an aqueous solution of HCl (10 wt %) to produce a single-component electrolyte membrane.

Experimental Example 1 and Comparative Experimental Examples 1-4

Manufacture of Membrane-Electrode Assemblies (MEAs)

A commercially available Nafion type perfluorosulfonated polymer solution (5%, 6 g) was mixed with 45 wt % Pt/C (Tanaka, 0.9 g). The mixture was subjected to sonication for 30 min to prepare a homogeneous slurry. The slurry was applied to each of the blend electrolyte membrane produced in Example 1 and the single-component electrolyte membranes produced in Comparative Examples 1-4 using a spray coater. A catalyst was loaded in fixed amounts of 0.4 mg/cm$^2$ on both an anode and a cathode. The resulting structure was dried at a temperature of 60° C. for one day to complete manufacture of a membrane-electrode assembly (MEA). A single cell was fabricated using the MEA. The performance of the single cell was measured under the conditions indicated in Table 2. After the single cell was maintained at a constant voltage of 0.6 V, polarization curves of the single cell were obtained at different time points and long-term performance of the single cell was evaluated.

TABLE 2

| Fuel | Oxidant | Temperature (° C.) | Relative Humidity (%) |
|---|---|---|---|
| Hydrogen | Air | 65 | 100 |
| Hydrogen | Air | 65 | 100 |

Figure 2:
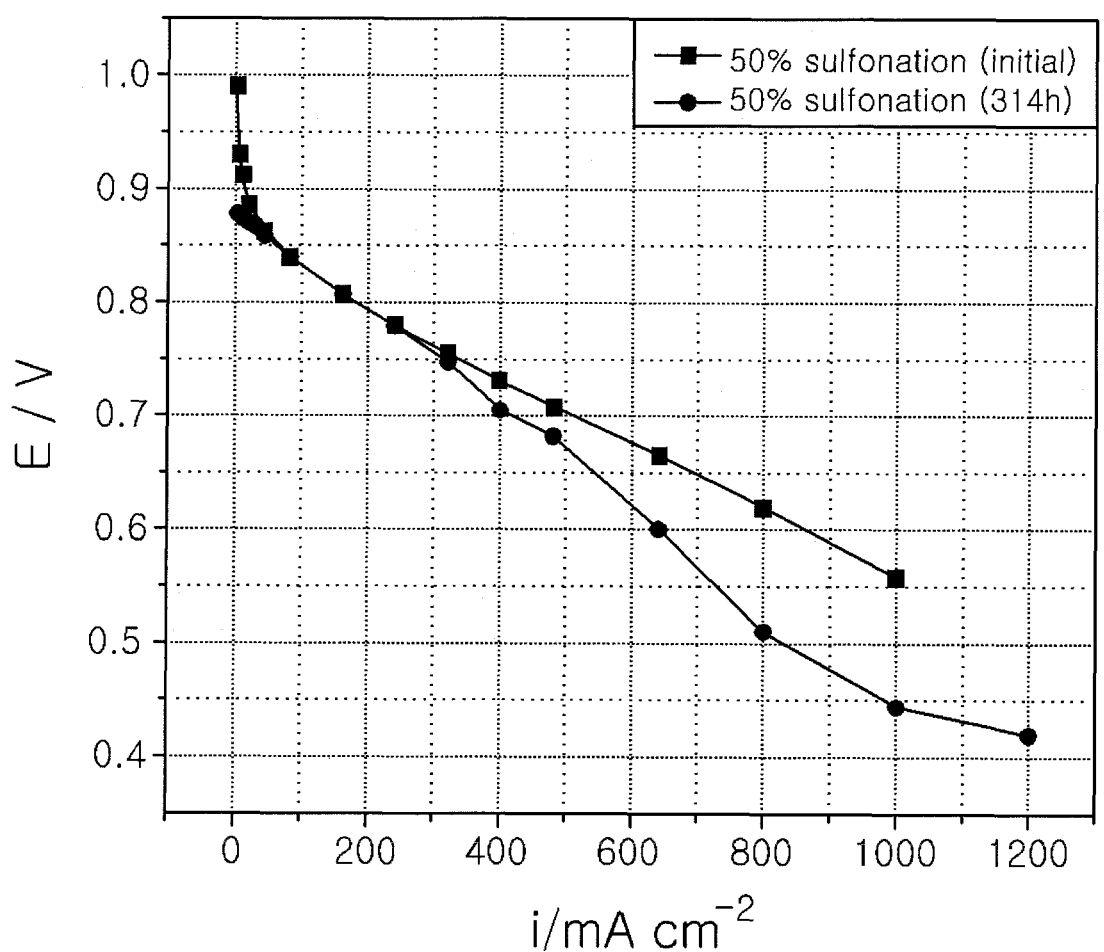
FIGS. 2 and 3 show test results for long-term performance of a membrane-electrode assembly including an electrolyte membrane produced using a polymer having a degree of sulfonation of 50% and long-term performance of a membrane-electrode assembly including an electrolyte membrane produced using a polymer having a degree of sulfonation of 40%, respectively.
Figure 3:
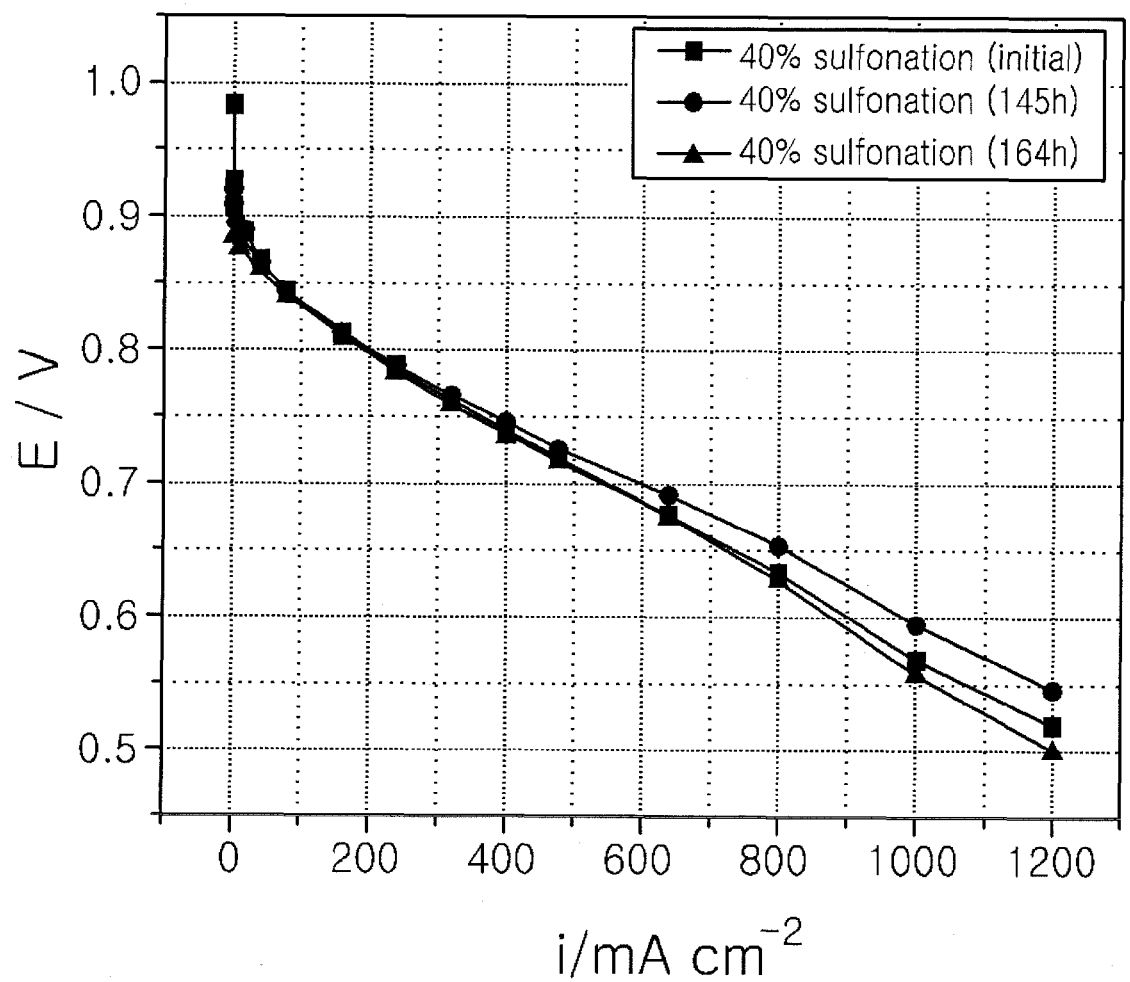
Figure 4:
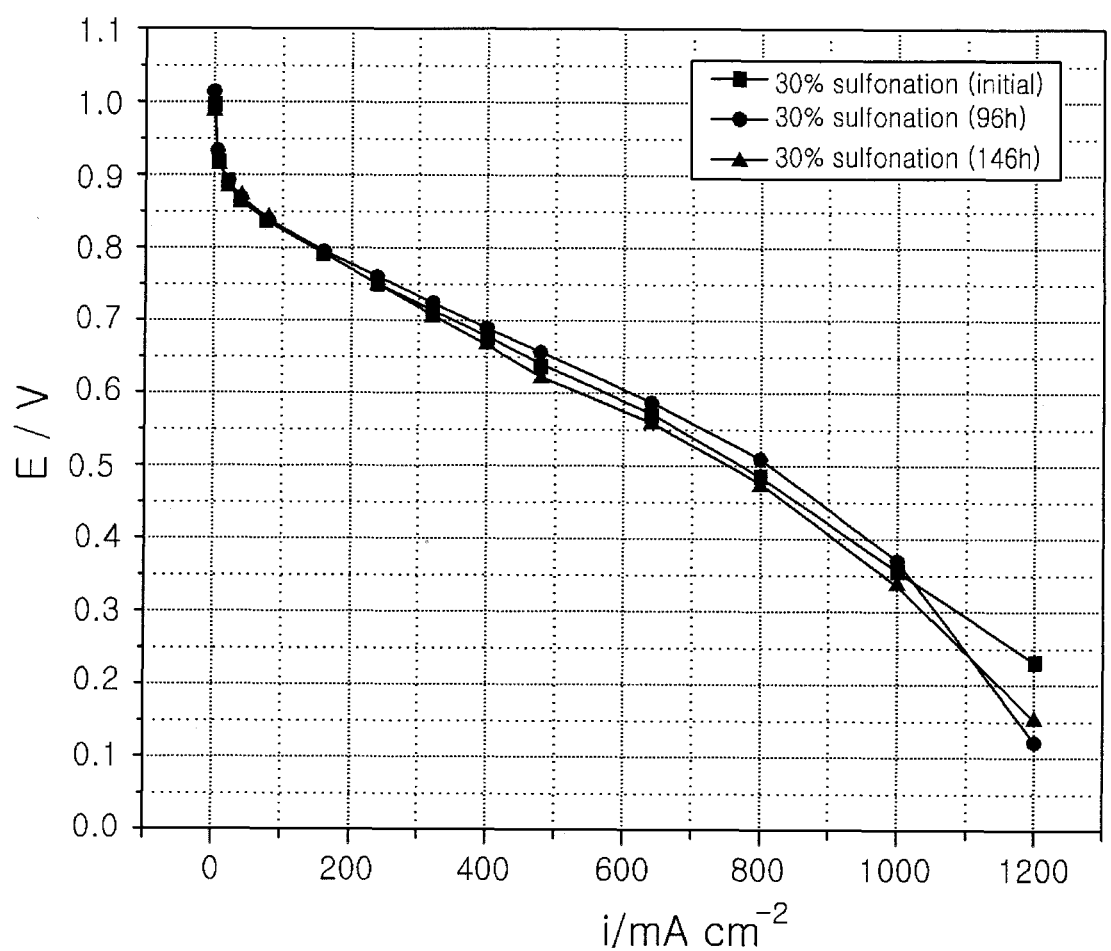
FIG. 4 shows test results for initial performance of a membrane-electrode assembly including an electrolyte membrane produced using a polymer having a degree of sulfonation of 30%.

The membrane-electrode assembly manufactured in Experimental Example 1 showed an initial current density of about 800 mA/cm$^2$ at 0.6 V. The current density of the membrane-electrode assembly was increased to about 1,000 mA/cm$^2$ after 479 hr and was maintained until 624 hr (FIG. 1). In contrast, in the membrane-electrode assemblies manufactured in Comparative Experimental Examples 1-2, a drop (≤0.9 V) in open circuit voltage within 300 hr and performance deterioration were observed (FIGS. 2 and 3). The membrane-electrode assembly manufactured in Comparative Experimental Example 3 showed a relatively low initial current density of about 600 mA/cm$^2$ at 0.6 V (FIG. 4).

Blends of two or more sulfonated polymers of the same kind or different kinds with different degrees of sulfonation were prepared although experimental results thereof were not explicitly presented above. Specifically, a blend of two block copolymers was prepared by condensation of (i) one or more monomers having a sulfonic acid group and (ii) one or more monomers having no sulfonic acid group in a specified molar ratio. The two block polymers had different degrees of sulfonation of 35-60% and 5-35%. The difference in degree of sulfonation between the block polymers was at least 10-30%. An electrolyte membrane was produced using the polymer blend. The electrolyte membrane was confirmed to show excellent effects such as improved long-term cell performance and good long-term dimensional stability and to suffer from no peeling at the membrane/electrode interfaces even after operation for a considerably long period of time, indicating that improved interfacial stability was ensured.

A blend of three block copolymers was prepared by condensation of (i) one or more monomers having a sulfonic acid group and (ii) one or more monomers having no sulfonic acid group in a specified molar ratio. The three block polymers had different degrees of sulfonation of 40-60%, 15-40% and 5-15%. The difference in degree of sulfonation between the block polymers was at least 10-30%. An electrolyte membrane was produced using the polymer blend. The electrolyte membrane was confirmed to show excellent effects such as improved long-term cell performance and good long-term dimensional stability and to suffer from no peeling at the membrane/electrode interfaces even after operation for a considerably long period of time, indicating that improved interfacial stability was ensured. Further, the electrolyte membrane was confirmed to show low sensitivity to variations in the pressure of reactive gases and to avoid the problem of water control.

As is apparent from the foregoing, the polymer electrolyte membranes according to the foregoing embodiments of the present invention can exhibit excellent effects such as improved long-term cell performance and good long-term dimensional stability while at the same time solving the problems of conventional hydrocarbon electrolyte membranes.

What is claimed is:

1. An electrolyte membrane for a fuel cell comprising a polymer blend of two poly(aryl ether sulfone)s having different degrees of sulfonation of 35 to 60% and 5 to 35%, the difference in degree of sulfonation between the poly(aryl ether sulfone)s being at least 5 to 40%.

2. An electrolyte membrane for a fuel cell comprising a polymer blend of three poly(aryl ether sulfone)s having different degrees of sulfonation of 40 to 60%, 15 to 40% and 5 to 15%, the difference in degree of sulfonation between the poly(aryl ether sulfone)s being at least 5 to 40%.

3. An electrolyte membrane for a fuel cell comprising a polymer blend of four poly(aryl ether sulfone)s having different degrees of sulfonation of 45 to 55%, 35 to 45%, 25 to 35% and 15 to 25%, the difference in degree of sulfonation between the poly(aryl ether sulfone)s being at least 5 to 40%.

4. The electrolyte membrane according to claim 1, wherein the two poly(aryl ether sulfone)s of the polymer blend are block copolymers.

5. The electrolyte membrane according to claim 1, wherein the two poly(aryl ether sulfone)s of the polymer blend are random copolymers.

6. The electrolyte membrane according to claim 2, wherein the three poly(aryl ether sulfone)s of the polymer blend are block copolymers.

7. The electrolyte membrane according to claim 2, wherein the three poly(aryl ether sulfone)s of the polymer blend are random copolymers.

8. The electrolyte membrane according to claim 3, wherein the three poly(aryl ether sulfone)s of the polymer blend are block copolymers.

9. The electrolyte membrane according to claim 3, wherein the three poly(aryl ether sulfone)s of the polymer blend are random copolymers.

10. An electrolyte membrane for a fuel cell comprising:

a disulfonated poly(ether sulfone) of Formula 1a (Formula 1a)

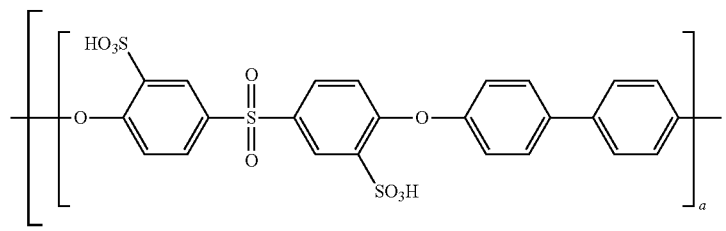

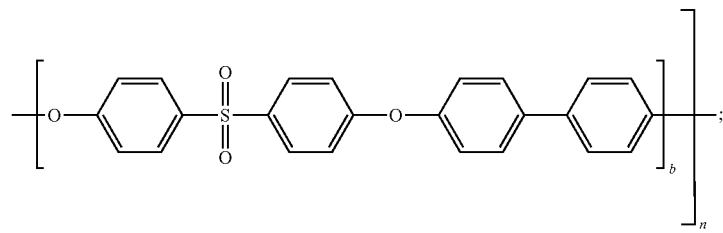

and
a monosulfonated poly(ether sulfone) of Formula 1b (Formula 1b)

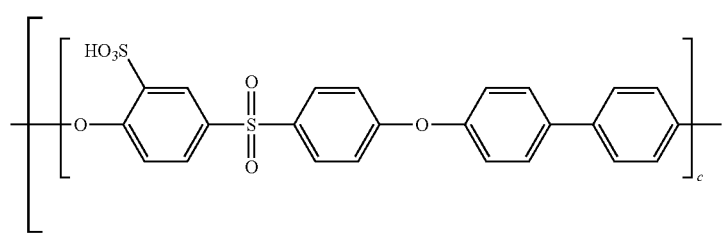

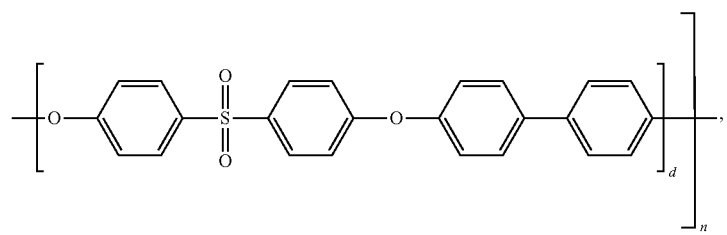

wherein n is a positive integer greater than 1, a and b are positive fractional ratios such that a+b=1, and c and d are positive fractional ratios such that c+d=1.

11. The electrolyte membrane of claim 10 wherein a is about 0.55, and b is about 0.45.

12. The electrolyte membrane of claim 10 wherein c is about 0.7, and d is about 0.3.

13. The electrolyte membrane of claim 10 wherein a is about 0.55, b is about 0.45, c is about 0.7, and d is about 0.3.

14. An electrolyte membrane for a fuel cell comprising:
a disulfonated poly(ether sulfone) of Formula 2a

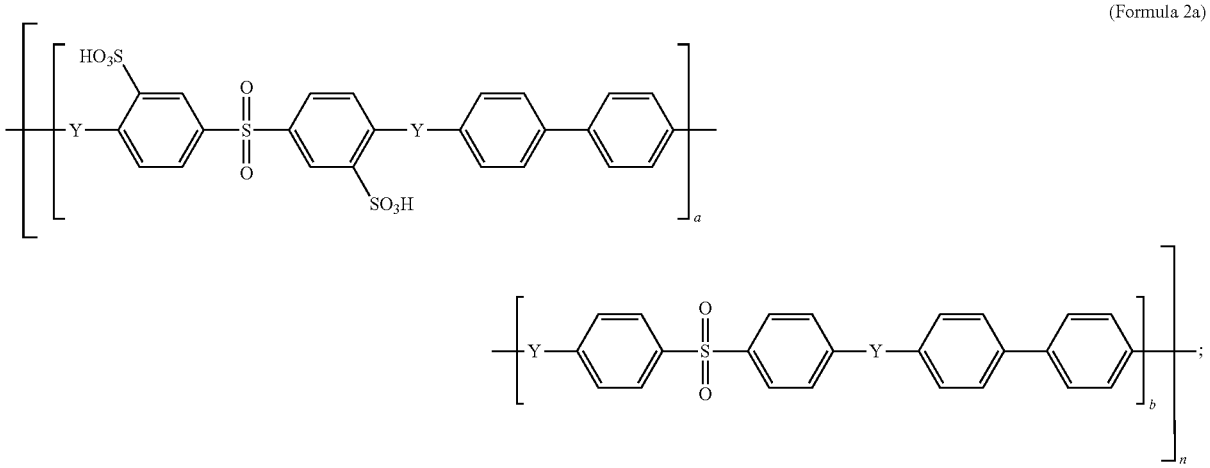

(Formula 2a)

and
a monosulfonated poly(ether sulfone) of Formula 2b

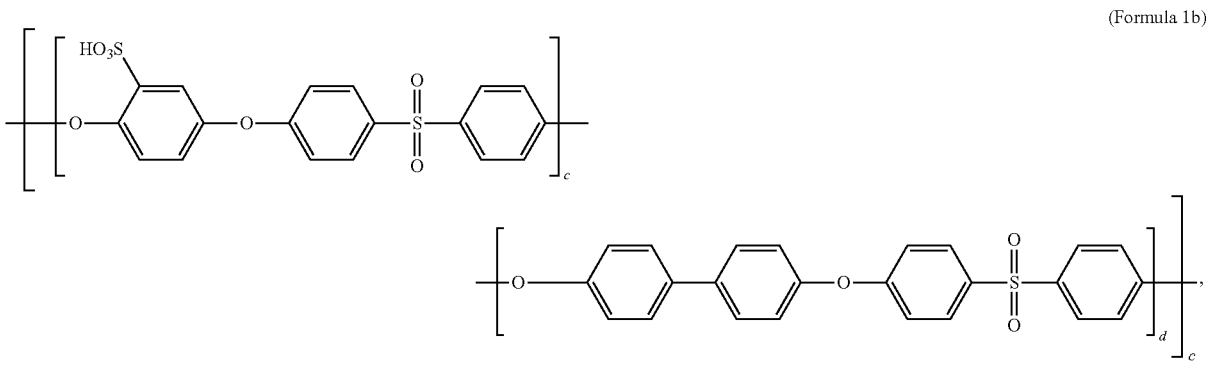

(Formula 1b)

wherein n is a positive integer greater than 1,

Y is O or S, a and b are positive fractional ratios such that a+b=1, and c and d are positive fractional ratios such that c+d=1.

15. The electrolyte membrane of claim 14 wherein a is about 0.55, and b is about 0.45.

16. The electrolyte membrane of claim 14 wherein c is about 0.5, and d is about 0.5.

* * * * *